Oct. 20, 1959    J. A. KNIEFEL    2,909,134
MACHINE FOR LAYING FLEXIBLE PIPE WITH ATTACHED RISERS
Filed Aug. 25, 1958    2 Sheets-Sheet 1

INVENTOR.
JOSEPH A. KNIEFEL
BY
Knox & Knox

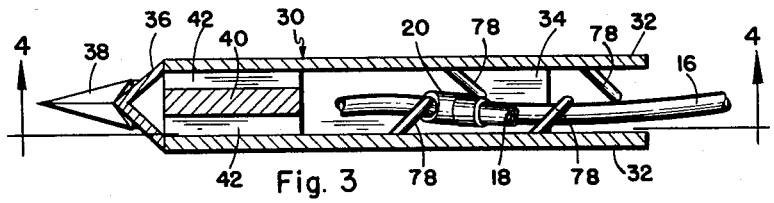
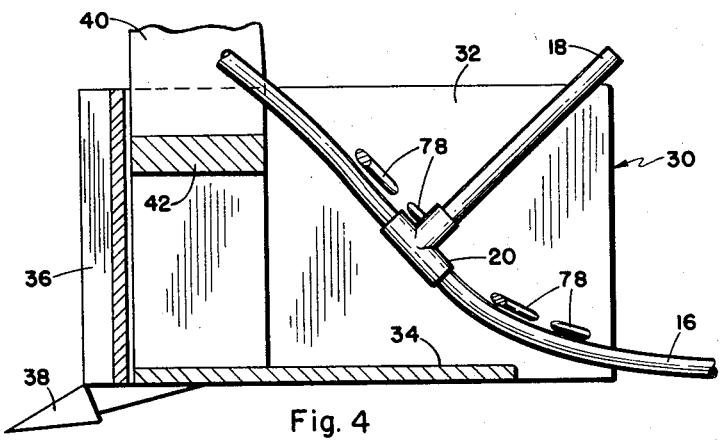
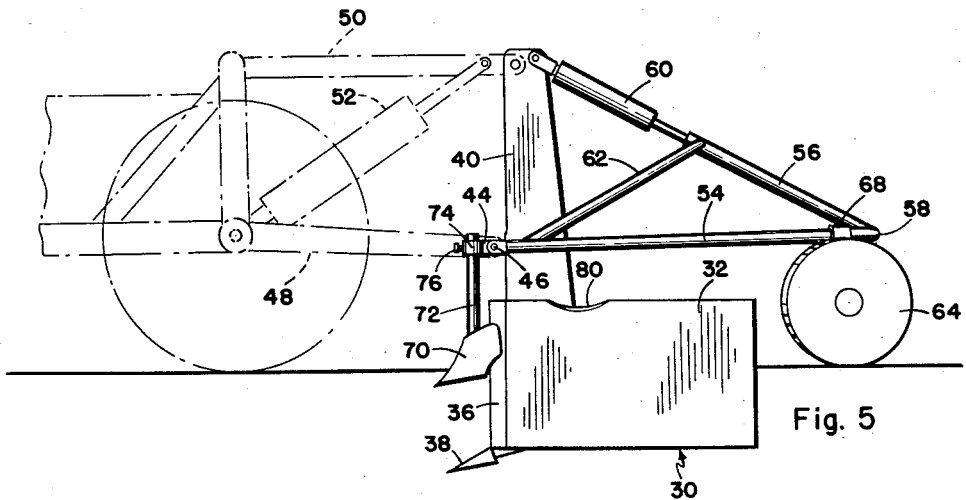

United States Patent Office 2,909,134
Patented Oct. 20, 1959

2,909,134

MACHINE FOR LAYING FLEXIBLE PIPE WITH ATTACHED RISERS

Joseph A. Kniefel, Fallbrook, Calif.

Application August 25, 1958, Serial No. 757,005

5 Claims. (Cl. 111—5)

The present invention relates generally to pipe laying machines and more particularly to a machine for laying flexible pipe with attached risers.

The primary object of this invention is to provide a machine for laying flexible or semi-rigid pipe with attached risers at spaced intervals, such as that used in sprinkler or irrigation systems.

Another object of this invention is to provide a pipe laying machine which picks up the pipe from the ground and erects the risers prior to the actual placement thereof in the ground, the operator being thereby enabled to detect any malfunction in the machine and the commonest imperfections in the assembled pipe before the pipe is actually layed.

A further object of this invention is to provide a pipe laying machine which prepares a trench, sets the pipe in the trench with the risers properly erected, and then covers the pipe and tamps the replaced soil in place.

Another object of this invention is to provide a pipe laying machine which is adjustable to bury the pipe at the proper depth to suit the length of the particular risers.

Still another object of this invention is to provide a pipe laying machine which can be attached to a conventional tractor hitch for towing.

Another object of this invention is to provide a pipe laying machine which is adapted for fabrication from many different materials, so that the choice of material can be according to the dictates of availability and price considerations, the exact sizes and proportions being matters easily determined to suit particular conditions and needs.

Another object of this invention is to provide a pipe laying machine which is practicable and inexpensive to manufacture.

Finally, it is an object to provide a pipe laying machine of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and in which:

Figure 3 is an enlarged sectional view taken on the line 3—3 of Figure 1;

Figure 4 is a sectional view taken on the line 4—4 of Figure 3; and

Figure 5 is a side elevation view of the trenching portion of the machine adjusted for a shallow trench.

Similar characters of reference indicate similar or identical elements and portions throughout the specification and throughout the views of the drawings.

Figures 1, 2:
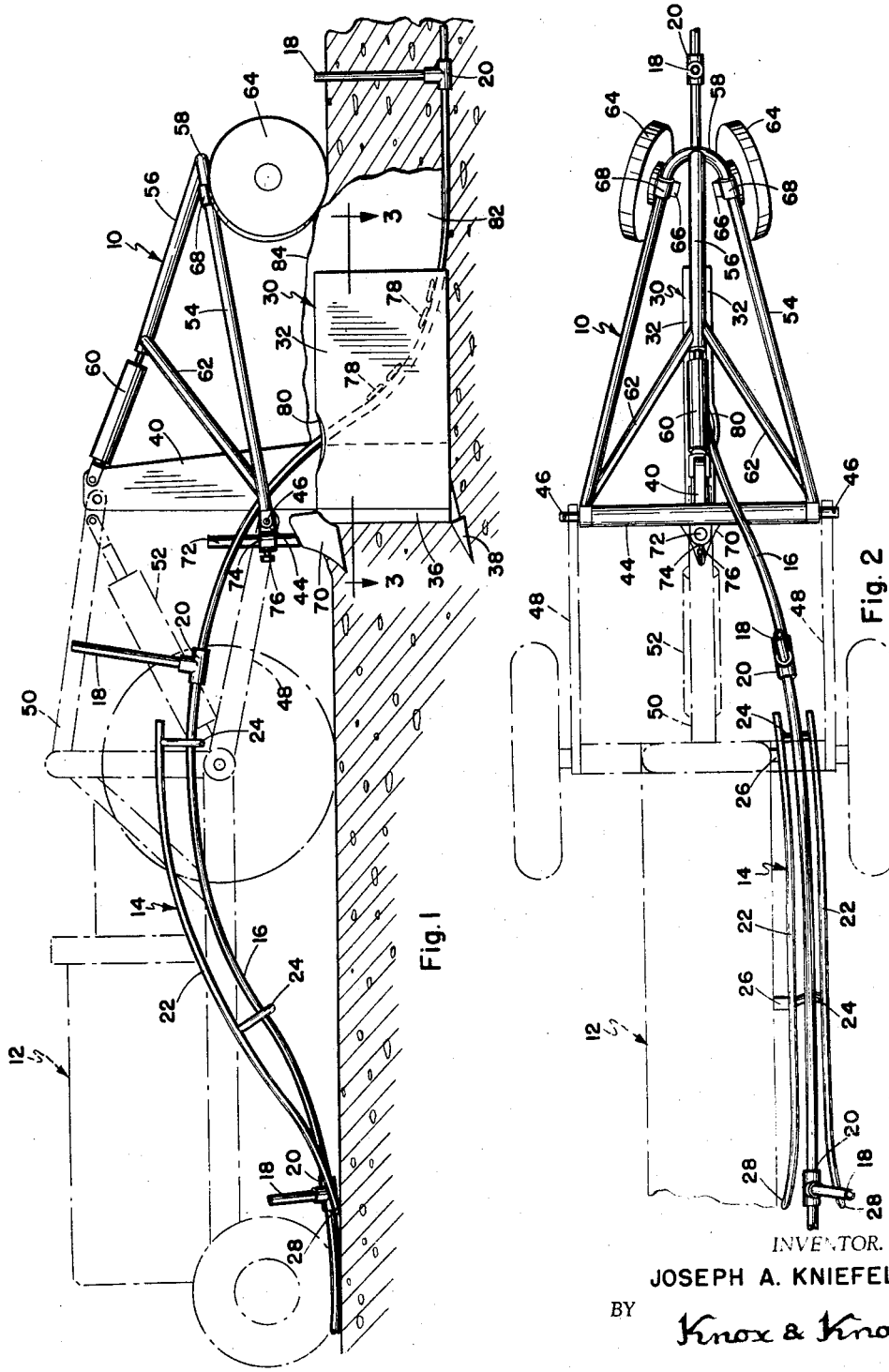
Figure 1 is a side elevation view of the pipe laying machine, the ground being shown in section and a tractor being indicated in broken line.
Figure 2 is a top plan view of the machine.

Referring now to the drawings in detail, the complete pipe laying machine comprises a trenching machine 10 which is attached to and towed behind a tractor 12, and a pick-up rack 14 which is mounted alongside the tractor to pick up the pipe. The pipe 16 is of flexible or semi-flexible material such as plastic, aluminum, or the like and has risers 18 of suitable length inserted at spaced intervals by means of T-connections 20. This type of assembled pipe with risers is used for sprinkler and irrigation systems and is normally made up and placed on the ground along the line where it is to be buried.

The pick-up rack 14 comprises a pair of horizontally spaced, parallel guide rails 22 secured to generally U-shaped support yokes 24 which bridge the guide rails at spaced intervals, said guide rails being formed in a smooth, upward-rearward curve which the pipe 16 can follow without being distorted or broken. The guide rails 22 and the support yokes 24 together constitute the upper trough or rack 14 through which the assembled pipe slides prior to its being layed. The pick-up rack 14 is mounted along the side of the tractor 12 by means of brackets 26 secured to convenient parts of the tractor frame, the forward ends of the guide rails 22 being flared apart to provide pick-up fingers 28 which are held close to the ground, as indicated in Figure 1, to pass underneath the risers 18 and lift the risers to an upright position.

The trenching machine 10 has an upright cutter frame 30 comprising a pair of flat, rectangular side plates 32, joined at the bottom by a base plate 34 extending from the forward end almost to the rear of said frame. The forward edges of the side plates 32 are interconnected by an upright V-shaped nose cutter 36 which penetrates the earth and opens a narrow trench. Fixed to the lower front corner of the cutter frame 30 is a sub-soil blade 38 to cut the base of the trench. Mounted at the forward end of the cutter frame 30 is an upright pillar 40, supported between the side plates 32 by spacers 42 and extending well above the side plates. Fixed to the pillar 40 slightly above the cutter frame 30 is a cross bar 44 having a short spindle 46 at each end to fit into the lower bars 48 of the tractor hitch. The upper bar 50 of the tractor hitch is secured to the top of the pillar 40, giving a three point attachment. This type of hitch is conventional and includes a fluid operated jack 52, or the like, for raising and lowering the hitch. Secured pivotally to the ends of the cross bar 44 are the ends of a generally V-shaped carriage frame 54 extending rearwardly beyond the cutter frame 30 and braced by a strut 56 attached at one end to the apex 58 of said carriage frame, the upper end of said strut being connected to the top of the pillar 40 by a small jack 60. This jack 60 may be fluid operated or of the screw type, according to requirements. The strut 56 is braced by a pair of stays 62 extending therefrom to the forward end of the carriage frame 54. At the rear end of the carriage frame 54 are two tamping wheels 64 mounted on axle units 66, which are secured to said frame by collars 68, or the like. The axle units 66 are angularly adjustable so that the tamping wheels 64 can be set at any desired angle of toe-out and camber. The tamping wheels 64 also support the rear end of the trenching machine and guide the cutter frame 30 along at the correct depth.

At the top front corner of the cutter frame 30 is a furrowing blade 70 having a support rod 72 which is held in a sleeve 74 fixed to the center of the cross bar 44. The sleeve 74 is provided with a set screw 76 so that the furrowing blade 70 may be adjusted vertically and locked in place.

On the inner faces of the side plates 32 are opposed staggered pairs of guide pins 78 individually inclined downwardly and rearwardly, said guide pins being positioned in spaced relation along a generally downwardly and rearwardly curved line to guide the pipe 16 downwardly in a curve to the bottom of the trench made by the cutter frame 30. The guide pins 78 project inwardly toward each other sufficiently to prevent the pipe 16 from escaping upwardly with a staggered and interdigitated spacing arrangement to allow the risers 18 to zig-zag through, as indicated in Figure 3, the risers being meanwhile held generally upright between the side plates 32. One of the side plates 32 may have an outwardly turned lip 80 at the upper forward edge thereof to provide additional clearance for the incoming pipe 16.

In laying out an irrigation system, the piping is spread on the ground in position and assembled with the risers in the required positions. The cutter frame 30 is started into the ground to initiate the opening of a trench 82, as in Figure 1, the trench being of a dept to suit the length of risers 18. One end of a length of assembled pipe 16 is then laid in the pick-up rack 14, resting on the support yokes 24, the end of the pipe being threaded through the cutter frame 30 beneath the guide pins 78 and into the trench 82. A suitable connection is made between the pipe 16 and a water supply. The trenching machine 10 is pulled by the tractor 12 so that the cutter frame 30 opens a continuous trench, the pick-up rack 14 supporting and feeding the pipe 16 into the cutter frame with the risers 18 erect. The furrowing blade 70 forms two furrows of soil 84 at the sides of the trench 82 and these are pressed back into the trench by the tamping wheels 64, which fill in the trench around the pipe and risers as the machine progresses. By adjustment of the axle units 66, the tamping wheels 64 can be set at the most effective angle for filling in the trench, the angle and spacing of the wheels being determined by the type of soil. If necessary, tamping wheels having fins or treads may be used to ensure proper filling of the trench.

By means of the jack 52, the entire trenching machine 10 may be raised or lowered on the conventional tractor hitch. To control the depth of the trench, the tamping wheels, which also support the rear of the trenching machine, are raised or lowered relative to the cutter frame 30 by adjusting the jack 60, thus limiting the depth to which the cutter frame can penetrate the soil. The pick-up rack 14 may be positioned and curved as necessary to support and feed the pipe 16 without bending the pipe sufficiently to break the joints or distort the pipe.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A machine for laying flexible pipe with attached risers, comprising: a cutter assembly for opening a narrow trench, said cutter assembly including a frame, an upright V-nose cutter secured to the front of said frame and having a vertical dimension approximately equal to the desired depth of the trench into which the pipe is to be layed, a pair of confronting, substantially vertical and flat plates secured to said frame and extending rearwardly from said V-nose cutter in substantially parallel relation and horizontally spaced apart a distance approximating the horizontal dimension of said V-nose cutter and substantially the height of the cutter, said plates defining an elongated open-topped trough with vertical sides to guide the pipe into the trench while maintaining said risers generally erect.

2. A machine for laying flexible pipe with attached risers, comprising: a trenching machine having a carriage frame; a cutter suspended beneath the forward end of said frame; said cutter comprising a pair of generally flat, spaced side plates having soil penetrating cutter means at the forward end thereof; supporting and tamping wheels mounted on the rear end of said frame; means carried by the machine in substantially fixed relation to said cutter for feeding pipe with attached risers into said cutter between said side plates; a plurality of opposed pairs of staggered guide pins fixed to said side plates and projecting inwardly therefrom, said guide pins being positioned to guide the pipe downwardly into a trench and being in spaced interdigitated relation to allow the risers to pass therebetween in a generally zig-zag downwardly curved path while the risers are held generally upright between said side plates; and means for attaching said trenching machine to a towing vehicle.

3. A machine for laying flexible pipe with attached risers, comprising: a trenching machine having a carriage frame; a cutter suspended beneath the forward end of said frame; said cutter comprising a pair of generally flat, spaced side plates having soil penetrating cutter means at the forward end thereof; supporting and tamping wheels mounted on the rear end of said frame; means carried by the machine in substantially fixed relation to said cutter for feeding pipe with attached risers into said cutter between said side plates; a plurality of opposed pairs of staggered guide pins fixed to said side plates and projecting inwardly therefrom, said guide pins being positioned to guide the pipe downwardly into a trench and being in spaced interdigitated relation to allow the risers to pass therebetween in a generally zig-zag downwardly curved path while the risers are held generally upright between said side plates; a furrowing blade adjustably mounted on the forward end of said cutter to deflect soil into raised furrows at the sides of the cutter; tamping wheels angularly adjustably mounted on said carriage frame to tamp the displaced soil back into its original position; and means for attaching said trenching machine to a towing vehicle.

4. A machine for laying flexible pipe with attached risers, comprising: a trenching machine having a carriage frame; a cutter suspended beneath the forward end of said frame; said cutter comprising a pair of generally flat, spaced side plates having soil penetrating cutter means at the forward end thereof; supporting and tamping wheels mounted on the rear end of said frame; means carried by the machine in substantially fixed relation to said cutter for feeding pipe with attached risers into said cutter between said side plates; a plurality of opposed pairs of staggered guide pins fixed to said side plates and projecting inwardly therefrom, said guide pins being positioned to guide the pipe downwardly into a trench and being in spaced interdigitated relation to allow the risers to pass therebetween in a generally zig-zag downwardly curved path while the risers are held generally upright between said side plates; a furrowing blade adjustably mounted on the forward end of said cutter to deflect soil into raised furrows at the sides of the cutter; tamping wheels angularly adjustably mounted on said carriage frame to tamp the displaced soil back into its original position; adjustable support means on said carriage frame and connected to said cutter, whereby said tamping wheels may be raised and lowered relative to the cutter to control the depth of the trench formed; and means for attaching said trenching machine to a towing vehicle.

5. A pipe laying machine according to claim 2 and including a pick-up rack having means for mounting on one side of a towing vehicle; said pick-up rack being shaped to support and guide the pipe into said cutter and having flared finger elements at the forward end thereof in close proximity to the ground to engage beneath each riser and lift the riser to an upright position; said pick-up rack having spaced side rails to hold the risers upright in their passage along the rack.

References Cited in the file of this patent

UNITED STATES PATENTS

| | | |
|---|---|---|
| 734,615 | Roberts | July 28, 1903 |
| 2,393,395 | Millard | Jan. 22, 1946 |
| 2,722,181 | Hash | Nov. 1, 1955 |

FOREIGN PATENTS

| | | |
|---|---|---|
| 36,551 | France | Mar. 18, 1930 |
| | (1st addition to 661,045 of Sept. 25, 1928) | |
| 657,173 | France | May 17, 1929 |